UNITED STATES PATENT OFFICE.

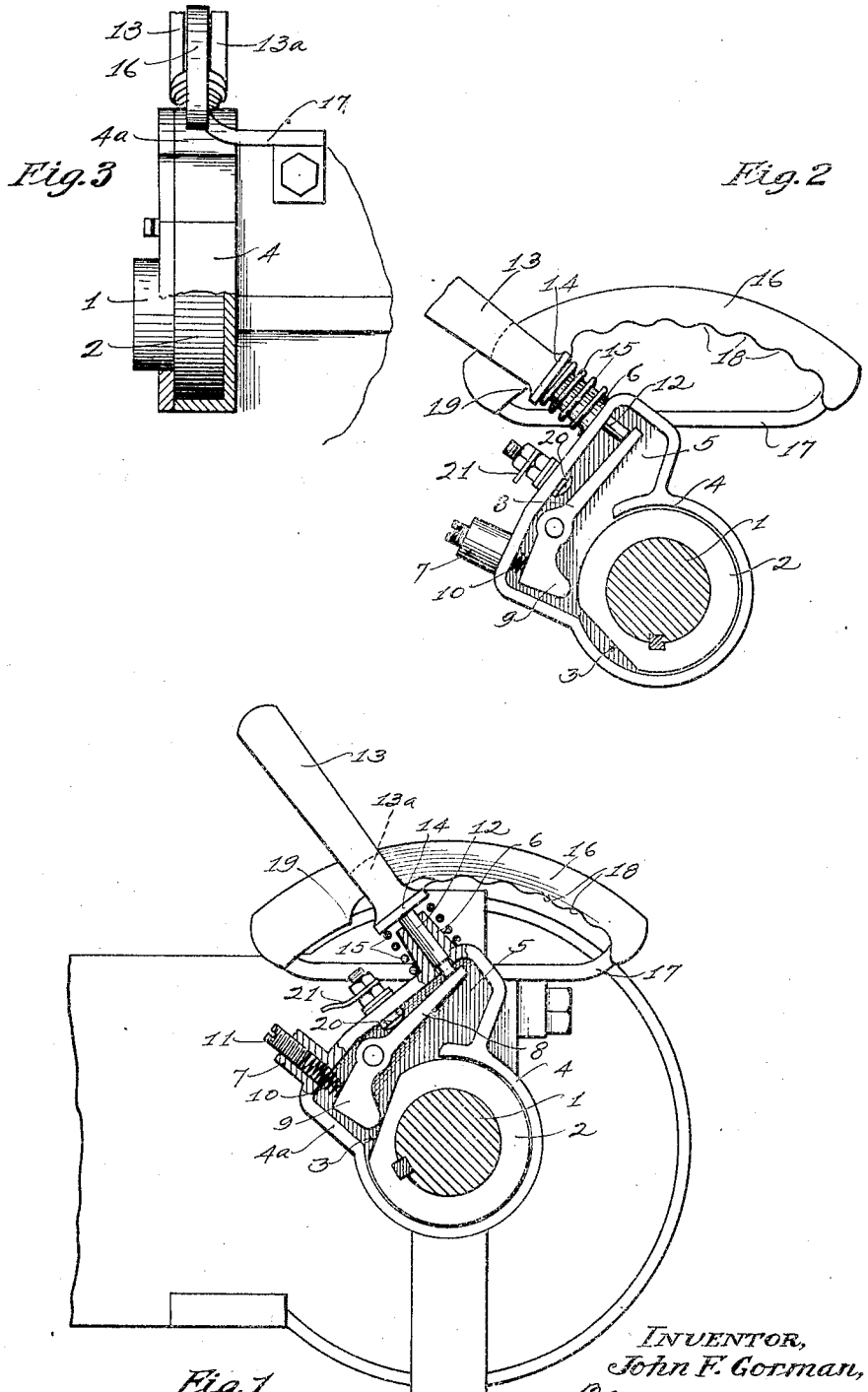

JOHN F. GORMAN, OF PORTLAND, OREGON.

SPARK-CONTROLLING MECHANISM FOR INTERNAL-COMBUSTION ENGINES.

1,336,350.  Specification of Letters Patent.  Patented Apr. 6, 1920.

Application filed September 16, 1918. Serial No. 255,200.

*To all whom it may concern:*

Be it known that I, JOHN F. GORMAN, a citizen of the United States, residing in the city of Portland, county of Multnomah, and State of Oregon, have invented certain new and useful Improvements in Spark-Controlling Mechanism for Internal-Combustion Engines, of which the following is a specification.

My invention relates to spark controlling mechanism for internal combustion engines and has for its principal object to provide a device of the character referred to having a single control lever, one movement of which controls the time of the spark, and another movement of which cuts out the spark, thus avoiding separate control members for the cut out and the timing mechanism, and providing a most simple, compact and effective device of the character referred to. While my device is especially designed for use in connection with portable power saws, it may be adapted for use in connection with any motor driven mechanism.

In order to more clearly explain my invention, I have illustrated the same on the accompanying sheets of drawings, in which:—

Figure 1 is a side elevation of one embodiment of my invention with parts removed and shown in section to disclose the construction and arrangement thereof;

Fig. 2 is a similar view showing the mechanism moved to the cut-out position; and Fig. 3 is a fragmentary edge view thereof.

Referring now more in detail to the drawings, 1 designates a shaft on which is secured a collar 2, having a flat portion 3. Mounted on said shaft around said collar 2, is a casing 4, having an extension 4ª to form a chamber 5, said extension being of substantially the form shown, and having a boss 6, and also a boss 7 thereon. Pivotally mounted in said chamber 5 is a lever 8, having a toe portion 9, operating as a cam on the collar 2. Mounted in the boss 7, on said casing, is a coiled spring 10 bearing at its inner end upon the pivoted lever 8, at the cam toe 9, and at its opposite end bearing against a set screw 11 in said boss 7, whereby the tension of said spring can be regulated. Mounted in the boss 6, on said extension is a pin 12, the inner end of which bears against the end of the pivoted lever 8, while its outer end carries a handle 13, having a flange shoulder at 14 against which bears a coiled spring 15, mounted around said boss 6, and the opposite end of which spring bears on the casing 4. At one side, said handle has a spaced finger portion 13ª, formed as a part thereof, and indicated in dotted lines in Figs. 1 and 2, and shown in edge view in Fig. 3. Rigidly mounted adjacent said handle 13 and between said handle 13 and its finger 13ª, is a quadrant 16, supported by a bracket 17, and having indents 18, for a part of its length, on its inner edge, and having a widened cam portion 19 at its opposite end. A contact 20, with means for electrical connections at 21, is provided through the casing, as clearly indicated, said contact 20 being adapted to contact with the pivoted lever 8, movably mounted in the casing extension chamber 5. The casing 4 is mounted to be moved around said shaft by means of the handle 13, thus moving the pivoted lever 8, and its cam toe 9 to different positions about said shaft. As said casing and said handle are moved to the right from the position shown in Fig. 1, they are held in different positions by the indents 18, on the quadrant 16. This positions the cam toe 9 relative to the flat surface 3 on the collar 2, for timing the spark. When said handle 13 is moved to the extreme left from the position shown in Fig. 1, and to the position shown in Fig. 2, said handle is forced downwardly by the cam portion 19 of the quadrant 16, so that the pin 12 thereof rocks the pivoted lever 8, away from the contact 20, thus avoiding the possibility of a spark, between said contact 20 and said pivoted lever 8.

Thus I have provided a very simple device by means of which the movement of a single member in one manner controls the timing of the spark, while the movement of the same member to a predetermined position, cuts out the spark, and while I have shown and described but one practical embodiment of my invention, I am aware that changes and adaptations therein can be made without departing from the spirit thereof, and I do not, therefore limit the invention, except as I may be limited by the hereto appended claims.

What I claim is:

1. In a mechanism of the character referred to, in combination with a moving member, a casing movable relative thereto, a movable contact member carried thereby and adapted to be intermittently actuated by said moving member, a fixed contact member carried by said casing and adapted to contact with said movable contact member, and means carried by said casing and having actuating connections with said movable contact member, whereby to move said casing together with said movable and said fixed contact members as a unit, and also for moving said movable contact member relative to said fixed contact member.

2. In combination with a revolving actuating member, means movable relative thereto, a movable contact member carried by said means and adapted to be intermittently actuated by said actuating member, a fixed contact member carried by said means and contacting with said movable contact member, and an operating member carried by said means for moving the same together with said movable and said fixed contact members as a unit relative to said actuating member, said operating member being also adapted for moving said movable contact member relative to said fixed contact member.

3. In combination, a driven actuating member, means carrying fixed and movable contact members and movable therewith as a unit relative to said driven actuating member, said driven actuating member being adapted to intermittently actuate said movable contact member relative to said fixed contact member, and means for moving said fixed and movable contact members as a unit relative to said driven actuating member, said means also having connections for moving the movable contact member relative to the fixed contact member.

4. In a spark controlling mechanism for internal combustion engines, contact members movably supported to be moved bodily as a unit, one of said contact members being also movable relative to the other, and common means for moving said contact members bodily together and for moving the movable contact member relative to the other contact member.

5. In combination with means for intermittently operating a contact member, two contact members mounted to be moved together bodily relative to said means, one of said contact members being movable relative to the other, and operable intermittently by said means, and a common control member connected for moving said contact members bodily together, and also for moving the movable contact member relative to the other contact member.

6. In combination with a revolving element, two contact members mounted to be moved together bodily relative to said element, one of said contact members being movable relative to the other contact member, and an operating member for moving said contact members bodily together relative to said revolving element, said operating member also having connections for moving said movable contact member relative to the other contact member.

7. In combination with a revolving element, movable means carrying two contact members adjacent said revolving element, one of said contact members being movable relative to the other contact member, a single operating member, operating connections therefrom for moving the means carrying said contact members, and operating connections therefrom for moving said movable contact member relative to the other contact member.

8. In combination with a shaft, a casing movably mounted thereon, a movable contact member carried by said casing, a fixed contact member carried by said casing, means on said shaft for intermittently operating said movable contact member, an operating member carried by said casing for moving said casing relative to said shaft, and operating connections from said operating member for moving said movable contact member relative to said fixed contact member.

9. In a device of the character referred to, in combination, a revolving element, a support movably mounted adjacent thereto, a fixed contact member thereon, a movable contact member thereon, an operating member for moving said support and said contact members relative to said revolving element, and operating connections from said operating member for moving said movable contact member away from said fixed contact member at will.

10. In a device of the character referred to, in combination, a revolving element, a casing movably mounted thereon, a movable contact member therein, means carried by said revolving element for intermittently operating said movable contact member, a fixed contact member carried by said casing and adapted to be engaged by said movable contact member, an operating handle for moving said casing, and operating connections from said handle for moving said movable contact member away from said fixed contact member, substantially as shown and described.

Signed at Los Angeles, in the county of Los Angeles, and State of California, this 26th day of August, 1918.

JOHN F. GORMAN.

In presence of—
WILLIAM R. LITZENBERG,
H. M. BRUNDAGE.